Aug. 28, 1945.  C. W. WOOD  2,383,833

DIFFERENTIAL CAM MECHANISM

Filed May 27, 1944

Inventor:
Charles W. Wood,
by Harry E. Dunham
His Attorney.

Patented Aug. 28, 1945

2,383,833

UNITED STATES PATENT OFFICE 2,383,833

DIFFERENTIAL CAM MECHANISM

Charles W. Wood, Schenectady, N. Y., assignor to General Electric Company, a corporation of New York Application May 27, 1944, Serial No. 537,561

4 Claims. (Cl. 74—567)

My invention relates to differential cam mechanisms, and more particularly to differential cam mechanisms operable in response to a predetermined differential between the angular displacement of a pair of axially aligned rotatable members. It is a general object of my invention to provide a new and improved cam mechanism of the above character which is both simple and inexpensive to manufacture, as well as durable and reliable in operation.

My invention may be utilized to prevent one of a pair of angularly movable members from exceeding the angular position of the other member while exerting no limitation upon the difference in angular position of the members in an opposite sense within the limits of travel of the members. Of course, as will be appreciated from the following detailed description, my invention may also be utilized to control positioning mechanism in such a manner as to prevent angular positional differential in either direction between a pair of rotatable members.

Accordingly, it is a further object of my invention to provide a cam mechanism for limiting the angular positional differential between two separately driven rotatable members.

It is a still further object of my invention to provide a cam mechanism applicable to the control of a pair of separately driven rotatable members in response to angular positional differential between the members in either one or both directions.

Figure 1:
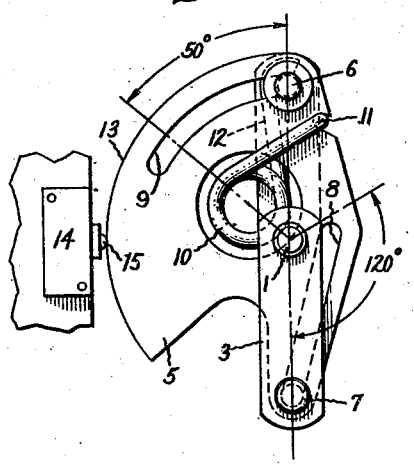
Figure 2:
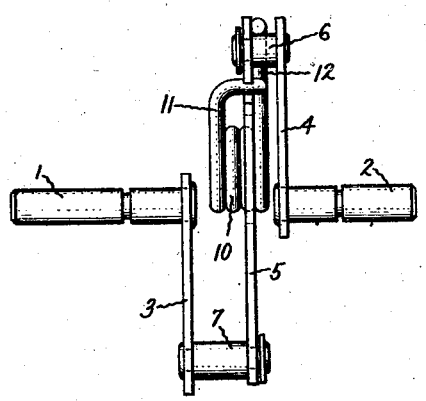

My invention itself will be more fully understood and its objects and advantages further appreciated by referring now to the following detailed specification taken in conjunction with the accompanying drawing in which Fig. 1 is a side elevation of a cam mechanism embodying my invention, and Fig. 2 is an end view of the mechanism.

In the drawing, I have shown a pair of axially aligned and axially spaced apart separately driven rotatable shafts 1 and 2 having attached at adjacent ends thereof a pair of normally oppositely extending radial arms 3 and 4, respectively. Between the ends of the shafts 1 and 2, there is disposed a cam plate 5 which is pivotally connected to the outer end of the radial arm 4 by means of a pin 6 and connected to the outer end of the arm 3 by a pin and slot connection comprising a pin 7 mounted upon the arm 3 and slidable within a slot 8 in the plate 5. The slot 8 extends substantially longitudinally of the radial arm 3 in its normal position but may form a slight angle therewith, as shown in the drawing. The precise direction and length of the substantially straight slot 8 is determined by the desired limits of angular displacement of the shafts 1 and 2, as will appear more clearly hereinafter. The pin 6, mounted in the outer end of the radial arm 4, slidably engages an arcuate slot 9 having its center of curvature approximately at the center line of the shafts 1 and 2, when the plate 5 is in its normal position (i. e. as shown in Fig. 1). Normally the pin 6 is maintained at the upper end of the slot 9 by means of a helical spring 10 having one arm 11 engaging the plate 5 and another arm 12 engaging the pin 6.

I have shown the plate 5 provided with an arcuate cam surface in the form of a sector of a circle having its center substantially coincident with the center line of the shafts 1 and 2 when in the normal position as shown in Fig. 1. The cam surface 13 may be disposed to actuate any suitable control or indicating device. By way of example, I have illustrated a snap action switch 14 having an actuating button 15 in operative engagement with the cam surface 13.

In the embodiment of my invention which I have shown by way of illustration, I have assumed that the maximum angular displacement of the shaft 1 is limited to 120 degrees, while the maximum angular displacement of the shaft 2 is limited to 50 degrees, both in a counterclockwise direction from the zero or normal positions shown in the drawing. Let it be further assumed, by way of example, that it is desired to prevent the angular displacement of the shaft 2 from exceeding the displacement of the shaft 1 at any point in the travel of the shaft 1 without limiting the angular positional differential of the shafts in the opposite direction. For this purpose, the switch 14 may be connected to control a driving motor or other position determining element connected to either of the shafts 1 or 2. For the sake of clarity, let it be assumed that the switch 14 is arranged to disable the driving element for the shaft 2 when the switch actuating member 15 is depressed.

In operation, it will be observed that, if the shafts 1 and 2 are synchronously rotated in a counterclockwise direction as viewed at Fig. 1, the plate 5 will rotate about the center line of the shafts 1 and 2 and the cam surface 13 will effect no movement of the switch actuating member 15. Furthermore, if the angular displacement of the shaft 1 exceeds that of the shaft 2, the radial arm 3 will produce a slight relative rotation of the plate 5 about the pin 6 mounted on the arm 4. Rotation of plate about the pin 6 will merely withdraw the cam surface 13 from engagement with the actuating member 15, so that the switch 14 will remain unaffected. It is evident, therefore, that the shaft 1 may exceed in angular position the position of the shaft 2 without limitation by the control switch 14.

If, however, the angular displacement of the shaft 2 tends to exceed the angular displacement of the shaft 1 at any point in the travel of the shaft 1, the radial arm 4 will produce a slight relative rotation of the plate 5 about the pin 7 attached to the radial arm 3. Such rotation of the plate 5 about the pin 7 will move the cam surface 13 toward the switch 14 thereby to depress the actuating button 15 and actuate the switch. Actuation of the switch 14 disables the positioning mechanism for the shaft 2 and thereby prevents further angular displacement of the shaft 2 until the displacement of the shaft 1 at least equals that of the shaft 2. When the angular displacements are again equal, the cam surface 13 is withdrawn from the switch 15. It may be noted that in the illustrated example of the invention the shaft 2 is limited to 50 degrees of angular displacement and that the shaft 1 may continue to rotate until it reaches its limit of movement at 120 degrees displacement. This overtravel of the shaft 1 with respect to the shaft 2 is permitted by the pin and slot connection 7, 8, and during the overtravel movement the pin 7 is moved upwardly in the slot 8 and the cam surface 13 withdrawn from engagement with the switch member 15.

The above explanation of the operation of my differential cam mechanism has omitted any reference to the spring 10. As mentioned hereinbefore, the spring 10 normally serves only to hold the pin 6 on the radial arm 4 in the upper end of the slot 9. Accordingly, since the spring 10 normally prevents movement of the pin 6 in the slot 9, the plate 5 is effectively pivotally mounted upon the pin 6. The spring 10, however, serves also as an emergency overtravel device in the event that the position control mechanism (not shown) fails to stop further angular displacement of the shaft 2 as soon as it exceeds that of the shaft 1 sufficiently to actuate the switch 14. It will be evident from the drawing that, without the slot 9, if the angular position of the shaft 2 is permitted to increase relative to that of the shaft 1 beyond the point just sufficient to actuate the switch 14, the cam plate 5 will continue to move toward the switch 14 thereby to crush the switch. However, in the form of the invention shown, excessive movement of the plate 5 to the left, as viewed at Fig. 1, is prevented by taking up any excessive overtravel of the shaft 2 in deformation of the spring 10 and movement of the pin 6 along the slot 9. It will, of course, be understood that if desired the spring 10 and slot 9 may be omitted and the plate 5 pivotally mounted upon the pin 6 in conventional manner.

While I have described only a preferred embodiment of my invention by way of illustration, many modifications will occur to those skilled in the art and I therefore wish to have it understood that I intend in the appended claims to cover all such modifications as fall within the true spirit and scope of my invention.

What I claim as new and desire to secure by Letters Patent of the United States, is:

1. A differential cam mechanism comprising a pair of driven shafts in aligned axially spaced relation, a pair of radial arms attached to said shafts at adjacent ends and normally extending in substantially opposite directions, a cam pivotally connected to the outer end of one of said arms, and a lost motion connection between said cam and the outer end of the other of said arms.

2. A differential cam mechanism comprising a pair of driven shafts in aligned axially spaced relation, a pair of radial arms attached to said shafts at adjacent ends thereof and normally extending in substantially opposite directions, a member provided with an arcuate cam surface having its center of curvature normally approximately coincident with the center line of said shafts, pivotal means connecting said member to the outer end of one of said radial arms, and a pin and slot connection between said member and the outer end of the other of said radial arms.

3. A differential cam mechanism comprising a pair of driven shafts in aligned axially spaced relation, a pair of radial arms attached to said shafts at adjacent ends thereof and normally extending in substantially opposite directions, a cam plate pivotally connected to the outer end of one of said arms, and a pin and slot connection between said plate and the outer end of the other of said arms, said connection comprising a substantially straight slot in said plate extending substantially longitudinally of said other radial arm.

4. A differential cam mechanism comprising a pair of separately driven shafts in aligned axially spaced relation, a pair of radial arms attached to said shafts at adjacent ends thereof and normally extending in substantially opposite directions, a pair of connecting pins extending laterally from the outer ends of said arms, a cam plate having a pair of slots slidably engaging said pins, one of said slots being arcuate and having its center of curvature normally substantially coincident with the center line of said shafts and the other of said slots being substantially straight and extending substantially longitudinally of the normal direction of said radial arms, and spring means for normally maintaining one of said pins at one end of said arcuate slot.

CHARLES W. WOOD.